United States Patent [19]
Horikawa et al.

[11] Patent Number: 5,409,322
[45] Date of Patent: Apr. 25, 1995

[54] APPARATUS FOR HOLDING TOOLS

[75] Inventors: Yoshiharu Horikawa; Shinichi Yokoi; Takanori Matsushima, all of Fukui, Japan

[73] Assignee: Matsuura Machinery Co., Ltd., Fukui, Japan

[21] Appl. No.: 127,750

[22] Filed: Sep. 27, 1993

[30] Foreign Application Priority Data

Sep. 28, 1992 [JP] Japan ................... 4-299069

[51] Int. Cl.$^6$ ................................... B25G 3/18
[52] U.S. Cl. ..................... 403/328; 409/233; 279/89; 279/900
[58] Field of Search ............. 403/328, 327, 326; 279/89, 900; 409/232, 233; 483/408, 239, 239 A

[56] References Cited

U.S. PATENT DOCUMENTS 2,162,359  6/1939  Rhinevault ............... 403/328
4,579,476  4/1986  Post ......................... 403/328
4,817,267  4/1989  Hitomi ...................... 409/233

FOREIGN PATENT DOCUMENTS 0077603  7/1963  Japan ........................ 409/233

Primary Examiner—Edward K. Look
Assistant Examiner—Mark Sgantzos
Attorney, Agent, or Firm—Burgess, Ryan & Wayne

[57] ABSTRACT

An improved tool holding apparatus includes a collet chuck or a steel ball chuck that clamps a pull bolt, which defines the forward end portion of a tool, by resilient force applied thereto from a coned disc spring. The tool holding apparatus further includes a temporary clamping device which is buried in a sleeve to temporarily clamp the pull bolt. A clamping force applied by the temporary clamping device is set at such a level that an arm can draw the tool from a main spindle by gripping the rear end portion of the tool.

13 Claims, 4 Drawing Sheets

APPARATUS FOR HOLDING TOOLS

BACKGROUND OF THE INVENTION

The present invention relates to an apparatus for sequentially changing tools and for holding a tool to be used in a machine tool that uses a plurality of tools.

In general, a plurality of tools are used in the operation of a machine tool. Since the tool operating position is limited, a tool changing operation is inevitably required.

Generally, at least 10 different tools are changed from one to another. In an extreme case, more than 100 different tools must be changed.

A tool holding apparatus, which has heretofore been used, employs an arrangement such as that shown in FIGS. 1(a) and 1(b) of the accompanying drawings. That is, a pull bolt 13, which defines the forward end portion of a tool 1, is clamped by using a collet chuck 32 or a steel ball chuck 33, which is disposed inside a sleeve 31, thereby holding the tool 1. To release the tool 1, it is unclamped by the forward (leftward as viewed in FIG. 1) movement of coned disc springs 36 and a drawbar 35.

Needless to say, the above-described clamping is extremely strong, so that it is impossible to draw the tool 1 from a main spindle 3 by gripping the rear end portion 11 of the tool 1 with an arm 2.

In the prior art, the operation of changing the tool 1 is carried out in the following sequence:

(1) The arm 2, which faces the tool holding apparatus, is rotated to grip the tool 1, which has already been used, at the rear end portion 11.

(2) The drawbar 35 is moved forwardly on the basis of the resilient force from the coned disc springs 36 under the control of a hydraulic cylinder (not shown), thereby releasing the tool 1 from the clamping that has been effected to the pull bolt 13 by the action of the collet chuck 32 or the steel ball chuck 33.

(3) The tool 1 is drawn from the main spindle 3.

(4) The arm 2 is rotated so that a tool 1 which is to be newly used comes to the position of the main spindle 3.

(5) The tool 1, which is to be newly used, is inserted into the main spindle 3 and the magazine.

(6) The drawbar 35 is moved backwardly to allow the collet chuck 32 or the steel ball chuck 33 to clamp the pull bolt 13 of the tool 1.

(7) The arm 2 is made to stop gripping the rear end portion 11 of the tool 1 and then rotated to move away.

The reason why the operation (2) is carried out after the operation (1) is that the tool 1 may fall if it is released from the clamping in the main spindle 3, as in the operation (2), before the arm 2 grips the tool 1 according to the procedure (1).

Further, the reason why the operation (7) is carried out after the operation (6) is that the tool 1 may fall unless the tool 1 is completely clamped by the operation (6) before the rear end portion 11 of the tool 1 is ungripped as stated in (7). Therefore, the arm 2 cannot be released from the tool gripping condition before the tool 1 is satisfactorily clamped.

However, it takes longer in the tool changing operation to carry out the operations (1) and (2), and the operations (6) and (7), serially. As the number of tools 1 which need to be changed increases, the dead time in the machining process unavoidably increases.

It is an object of the present invention to overcome the above-described disadvantage of the prior art and to provide an improved apparatus for holding tools, which makes it possible to simultaneously carry out the steps (1) and (2), and the steps (6) and (7).

SUMMARY OF THE INVENTION

To attain the above-described object, the present invention provides a tool holding apparatus which clamps a pull bolt that defines the forward end portion of a tool by using a clamping force based on a coned disc spring and a drawbar, which is applied to a collet chuck or a steel ball chuck in a sleeve, wherein the improvement comprises a collet chuck or a steel ball chuck, which is engaged with a coned disc spring and a drawbar, to clamp the pull bolt; and a temporary clamping device including a clamping member which is movable in engagement with an elastic spring of its own, without engaging with either the coned disc spring or the drawbar, thereby temporarily clamping the pull bolt.

DETAILED DESCRIPTION OF THE PREFERRED EMBODIMENTS

Figure 1A:
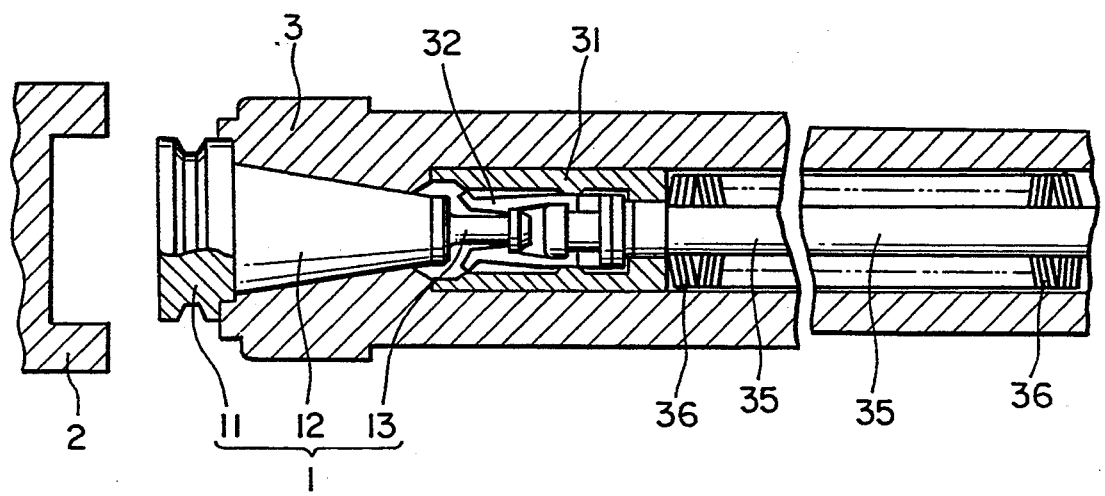
FIGS. 1(a) and 1(b) are sectional side views prior art showing the arrangement of conventional tool holding apparatus.
Figure 1B:
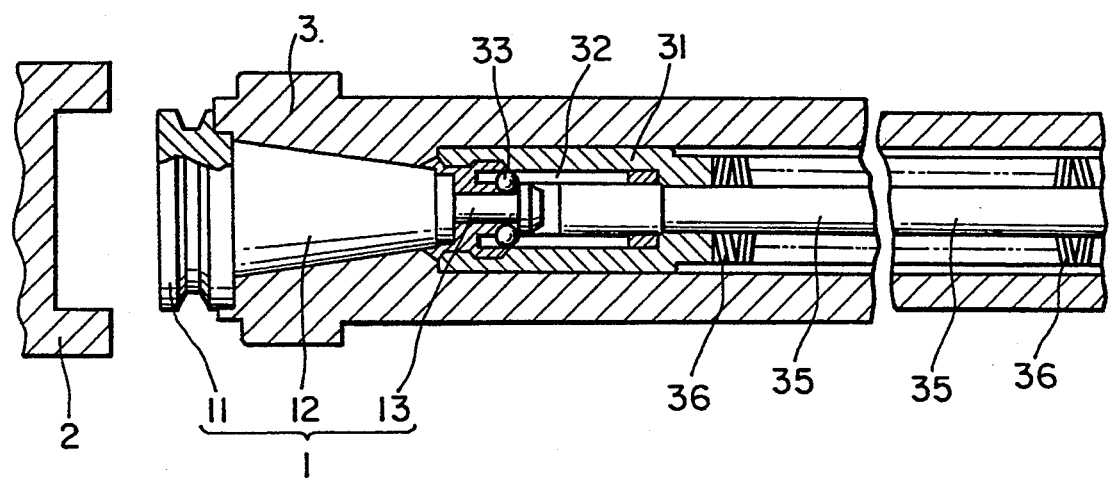

In the invention of this application, the clamping force with which a tool is clamped by a collet chuck or a steel ball chuck, which is engaged with coned disc springs and a drawbar, is so strong that the tool will not come off the main spindle even if it is pulled backwardly by gripping the rear end portion thereof with a human hand or an arm.

On the other hand, in the stage where the tool has been released from the clamping by advancing the drawbar on the basis of the resilient force from the coned disc springs, clamping members, that is, steel balls, which are engaged with respective elastic springs, clamp the pull bolt provided at the forward end of the tool.

However, the object of the clamping by the elastic springs and the clamping members is to clamp the tool temporarily. Therefore, the clamping force for this purpose is considerably weak in comparison to that for the clamping by the collet chuck or steel ball chuck, and it is set at such a level that the tool can be readily released when drawn by gripping the rear end portion thereof.

In such a temporary clamping stage, the operation (1) of gripping the tool with the arm and the operation (2)

of releasing the tool from the clamping can be simultaneously carried out.

Similarly, a tool that is newly inserted can be temporarily clamped by the elastic springs and the steel balls to such an extent that the tool will not come off accidentally, before the pull bolt of the tool is firmly clamped with the collet chuck on the basis of the coned disc springs by moving the drawbar backwardly. Therefore, it is possible to simultaneously carry out the operation (6) in which the pull bolt of the tool is clamped with the collet chuck or steel ball chuck, and the operation (7), in which the arm is made to stop gripping the holder portion of the tool and then rotated to move away.

In other words, the temporary clamping by the elastic springs and the steel balls engaged therewith makes it possible to simultaneously carry out the operations (1) and (2), and the operations (6) and (7). Thus, it becomes possible to reduce the time required for changing tools in comparison to the time required in the prior art (by about 20% according to actual measurements).

It should be noted that temporary clamping that is applied to such an extent that the tool can be drawn out with the arm, as described above, depends on the compressive force of the elastic springs and the configuration of the clamping members, but the configuration of the clamping members is not particularly limited. However, it is preferable for the clamping members to have a distal end portion which is in the form of a smoothly curved projection, with a view to allowing the clamping members to come off the tool smoothly when the arm draws it by gripping the rear end portion thereof.

Figure 2A:
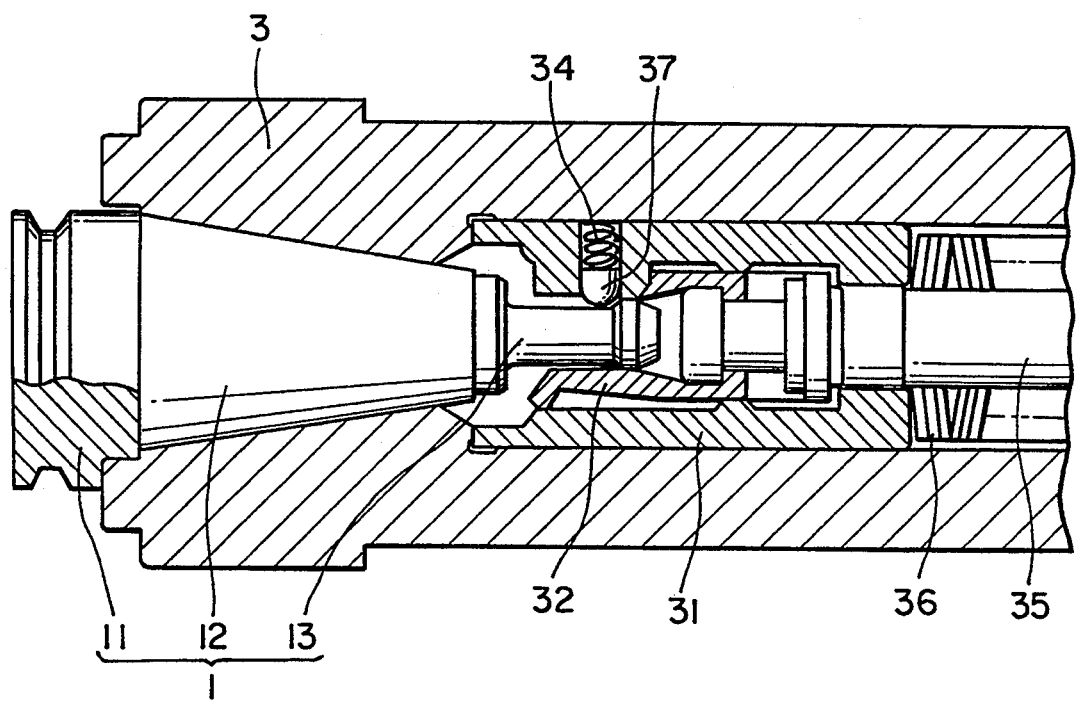
FIGS. 2(a) and 2(b) are a longitudinal sectional side view showing the arrangement of a first embodiment of the invention, and a transverse side view showing the arrangement of a chuck and steel balls, respectively.
Figure 2B:
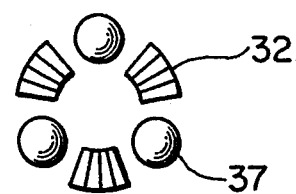

Embodiment 1:

FIGS. 2(a) and 2(b) show an embodiment in which pins 37 whose distal ends are in the form of smoothly curved projections, that is, which have rounded ends, are used as clamping members that temporarily clamp the pull bolt. Specifically, units, each including one pin 37 and one elastic spring 34, are inserted in openings in sleeve 31, so that a part of each pin 37 can project from and be withdrawn into the inner wall of sleeve 31 in a direction perpendicular to the direction in which tool 1 is inserted and removed. This is accomplished by the extension and contraction of elastic spring 34. It is noted that, in FIGS. 2(a) and 2(b), a collet chuck 32 is used as the chuck that is engaged with a coned disc spring 36 and a drawbar 35. However, a steel ball chuck can also be used in the same way. Preferably, the units are equiangularly spaced from each other.

More specifically, in the stage where the clamping by the collet chuck 32 has been ended, the pull bolt 13 is temporarily clamped through the pins 37 by the compressive force from the elastic springs 34. The clamping force for the temporary clamping is set at such a level that the tool can be released from the clamping when the arm (not shown in FIG. 2(a)) draws it backwardly (away from the main spindle 3) by gripping the rear end portion 11.

Figure 3A:
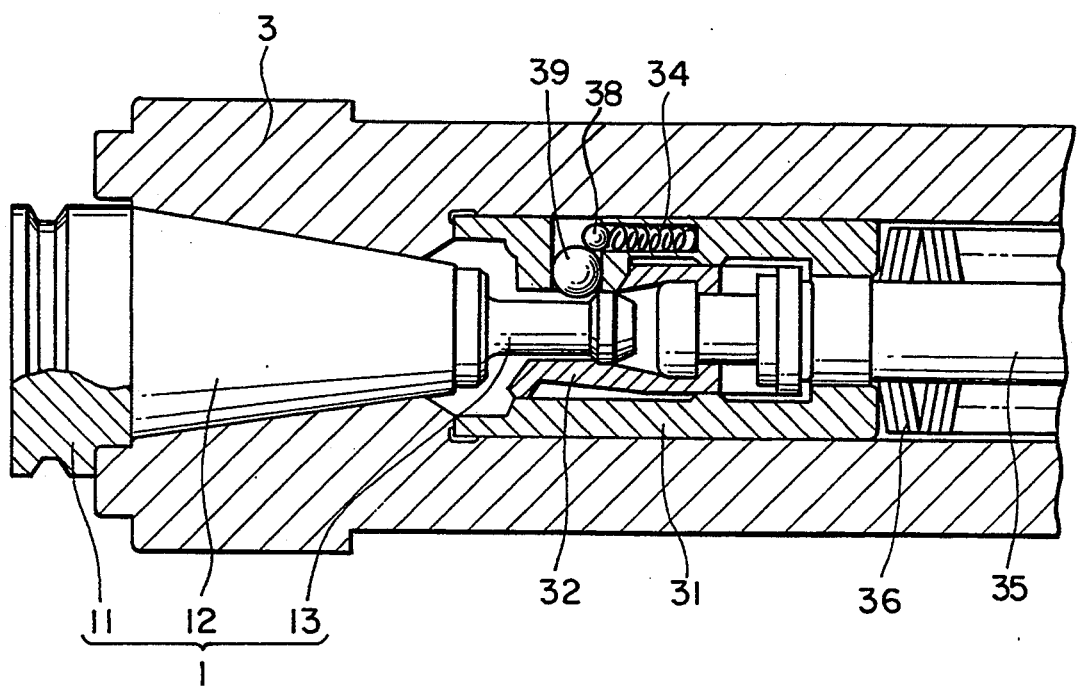
FIGS. 3(a) and 3(b) are a longitudinal sectional side view showing the arrangement of a second embodiment of the invention, and a transverse side view showing the arrangement of a chuck and steel balls, respectively.
Figure 3B:
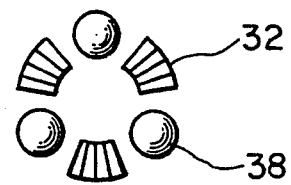

Embodiment 2:

FIGS. 3 (a) and 3 (b) show an embodiment in which steel balls 38 and 39 are used as clamping members that temporarily clamp the pull bolt. Specifically, units, each including one steel ball 38, one steel ball 39 and one elastic spring 34, are inserted in sleeve 31, so that elastic spring 34 moves steel ball 39 in the same direction as that in which tool 1 is inserted and removed. Each steel ball 39 slides in contact with that end portion of the other steel ball 38 of the respective unit which is farthest from the inner side of sleeve 31, thereby causing a part of steel ball 38 to project from and withdraw from the inner wall of sleeve 31.

In this case also, the clamping force that is applied through steel balls 38 and 39 is set at such a level that the tool can be released from the clamping force when the arm draws it backwardly (away from the main spindle 3) by gripping the rear end portion 11 of the tool, in the same way as in the first embodiment. It is noted that although, in FIGS. 3(a) and 3(b), a collet chuck 32 is used as a chuck that is engaged with a coned disc spring 36 and a drawbar 35, a steel ball chuck can also be used in the same way.

Although the foregoing embodiments respectively use steel balls and pins whose distal ends are in the form of smoothly curved projections as members that temporarily clamp the tool, the clamping members are not necessarily limited to these embodiments.

Figure 4:
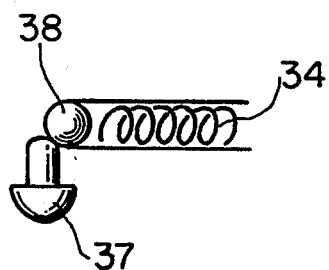
FIG. 4 is a fragmentary side view showing an arrangement in which a pin whose distal end is in the form of a smoothly curved projection is used as one of two steel balls used in the second embodiment of the invention.

It is possible to use the steel balls in the first embodiment as clamping members. Alternatively, the pins may be used in the second embodiment as clamping members. Further, it is possible to use pins 37 whose distal end is in the form of a smoothly curved projection in place of steel balls 39 used in the second embodiment, as shown in FIG. 4.

In the present invention, arranged as described above, the steps (1) and (2), and the steps (6) and (7), can be simultaneously carried out. Therefore, the time required for changing tools can be correspondingly shortened.

Accordingly, the invention of this application is applied even more advantageously to a complicated process which needs to change tools frequently.

Since such a complicated process can be realized with a relatively simple arrangement, such as that shown in FIGS. 2(a) and 2(b) or FIGS. 3(a) and 3(b), the value of the invention of this application is deemed to be extremely high from an economic viewpoint as well.

What is claimed is:

1. A tool holding apparatus for clamping a pull bolt that defines a forward end portion of a tool, comprising:
   chuck means for clamping said pull bolt;
   coned disc spring means and drawbar means for together forcing said chuck means to clamp and release said pull bolt; and
   temporary clamping means for temporarily clamping said pull bolt, said temporary clamping means including:
   clamping member means for temporarily engaging and clamping said pull bolt, with said clamping means being out of engagement with said coned disc spring means and said drawbar means, said temporary clamping means including a first steel ball and a second steel ball, said second steel ball interposed between the first steel ball and an elastic spring means wherein said elastic spring means biases, the first ball via the second ball, and
   elastic spring means for biasing said clamping member means into temporary clamping arrangement with said pull bolt.

2. The tool holding apparatus of claim 1 wherein the first steel ball is positioned to move perpendicular to a direction in which said pull bolt of said tool is inserted and removed, and said second steel ball being biased into engagement with the first steel ball in said direction in which said pull bolt of said tool is inserted and removed.

3. The tool holding apparatus of claim 1 wherein said clamping member means includes a pin having a rounded distal end.

4. The tool holding apparatus of claim 1 wherein said temporary clamping means comprises a plurality of units, each unit including one of said clamping member means and one of said elastic spring means.

5. The tool holding apparatus of claim 4 wherein each said clamping member means and elastic spring means are buried in a sleeve through which said pull bolt is insertable, so that said clamping member means is extended and contracted in a direction perpendicular to a direction in which said pull bolt of said tool is inserted and removed, thereby causing a part of said clamping member means to project from and withdraw into an inner wall of said sleeve.

6. The tool holding apparatus of claim 5 wherein each unit of said clamping member means includes a pin having a rounded distal end, with said pin and said elastic spring means of each unit being movable so as to extend and contract in a direction perpendicular to said direction in which said pull bolt of said tool is inserted and removed.

7. A tool holding apparatus according to claim 1 wherein said chuck means includes a steel ball chuck.

8. A tool holding apparatus according to claim 1 wherein said chuck means includes a collet chuck.

9. A tool holding apparatus for clamping a pull bolt that defines a forward end portion of a tool, comprising:
   chuck means for clamping said pull bolt;
   coned disc spring means and drawbar means for together forcing said chuck means to clamp and release said pull bolt; and
   temporary clamping means comprising a plurality of units for temporarily clamping said pull bolt, each unit of said temporary clamping means including:
   clamping member means for temporarily engaging and clamping said pull bolt, with said clamping means being out of engagement with said coned disc spring means and said drawbar means,
   elastic spring means for biasing said clamping member means into temporary clamping arrangement with said pull bolt,
   a first steel ball, movable so as to extend and contract in a direction perpendicular to said direction in which said pull bolt of said tool is inserted and removed, and
   a second steel ball interposed between the first steel ball and said elastic spring means, wherein said elastic spring means biases the first steel ball via said second steel ball, with said second steel ball and said elastic spring means being movable so as to extend and contract in said direction in which said pull bolt of said tool is inserted and removed.

10. The tool holding apparatus of claim 9 wherein said clamping member means includes a pin having a rounded distal end.

11. The tool holding apparatus of claim 9 wherein each unit of said clamping member means further includes a pin having a rounded distal end, with said pin and said elastic spring means of each said unit being movable so as to extend and contract in a direction perpendicular to said direction in which said pull bolt of said tool is inserted and removed.

12. The tool holding apparatus of claim 9 wherein said chuck means includes a steel ball chuck.

13. The tool holding apparatus of claim 9 wherein said chuck means includes a collet chuck.

* * * * *